Patented June 15, 1926.

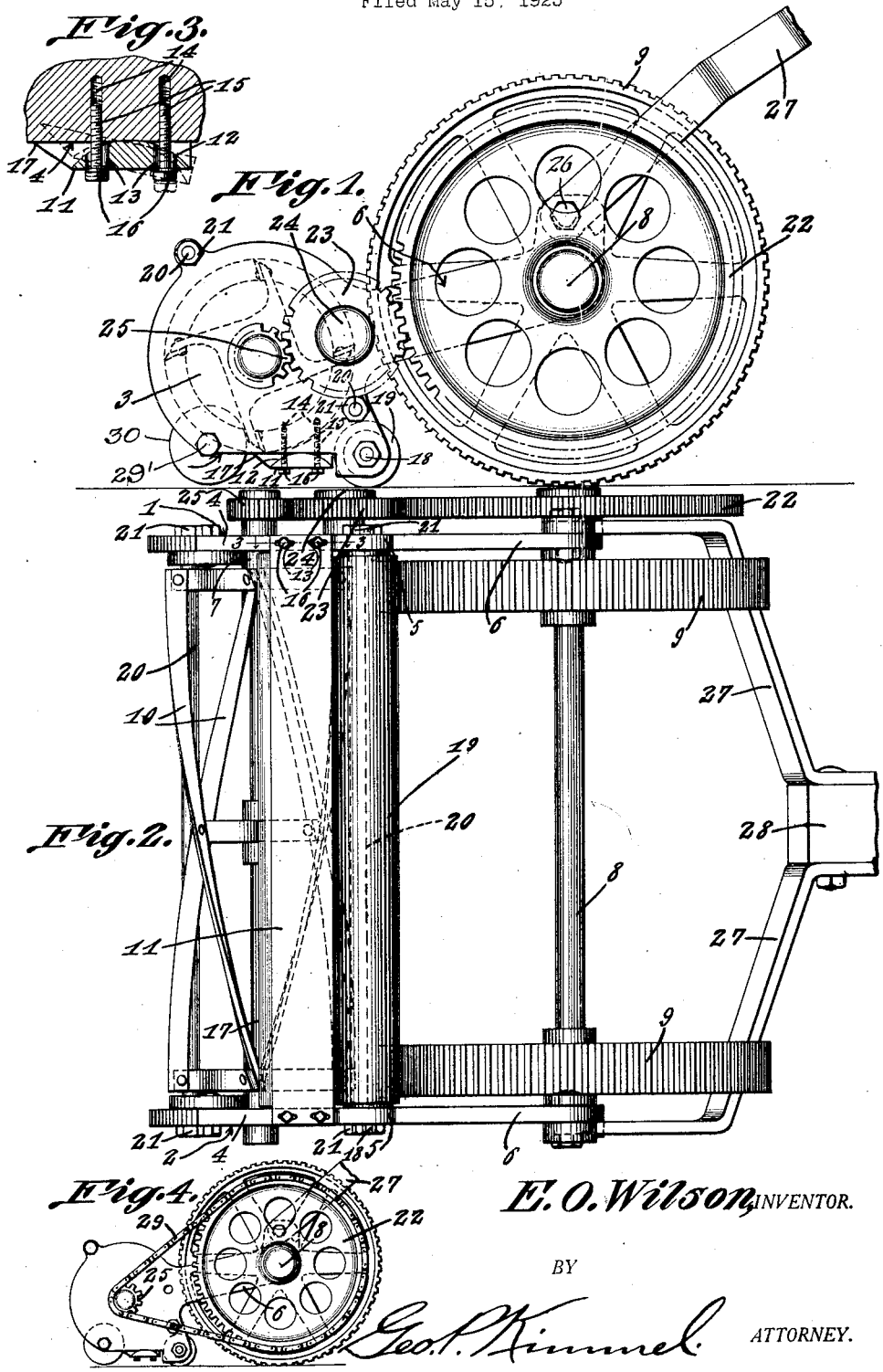

1,589,279

UNITED STATES PATENT OFFICE.

EDWARD O. WILSON, OF MADISON, WISCONSIN.

LAWN MOWER.

Application filed May 15, 1925. Serial No. 30,507.

This invention relates to lawn mowers and has for its primary object the provision, as in the manner hereinafter set forth, of a lawn mower having the cutting blades thereof mounted forwardly of the traction wheels, in such a manner that grass may be mown in close proximity to a wall or fence, and further, the cutting knives are so mounted that the grass will be cut in front of the traction wheels of the machine thus preventing the wheels from mashing down unmown grass before the cutter passes thereover.

A further object of the invention is the provision, in a manner as hereinafter set forth, of a lawn mower having an improved frame construction whereby greater lightness is obtained and at the same time increasing the efficiency and durability of the device.

Still another object of the invention is the provision, in a manner as hereinafter set forth, of a lawn mower having the cutter bar thereof mounted in a new and novel manner, the manner being such that the bar can be rocked to adjust the front or cutting edge thereof in proper relation with respect to the cutting blades of the mower.

A final object of the invention is the provision, in a manner as hereinafter set forth, of a lawn mower of improved construction, light weight, durable, of easy manipulation, having few parts making it extremely easy to assemble and disassemble, and inexpensive to manufacture.

The invention will be best understood from the consideration of the following detailed description taken in connection with the accompanying drawing forming a part of this specification, with the understanding however, that the invention is not conformed to any strict conformity with the showing of the drawing, but may be changed and modified so long as such changes and modifications mark no material departure from the salient features of the invention as expressed in the appended claim.

In the drawing:

Figure 1 is a side elevation of the mower embodying this invention.

Figure 2 is a bottom plan view of the same.

Figure 3 is a section taken upon the line 3—3 of Figure 2.

Figure 4 is a side elevation of the mower equipped with a chain drive instead of the gear train shown in Figure 1.

Referring now to the drawing in detail wherein like numerals of reference indicate corresponding parts throughout the several views, the device embodying this invention comprises a frame formed of a pair of spaced members or plates 1 and 2 respectively. These plates 1 and 2 as shown, each comprises a substantially circular forward portion 3 having a part of the edge thereof cut flat as at 4 and further having projecting rearwardly therefrom at one end of said flat or straight portion 4 a foot 5. Extending upwardly and rearwardly from the portion 3 of each of the plates is a relatively narrow arm 6.

The circular portions 3 of the plates each has a central aperture therethrough and the free end of each of the arms 6 also has an aperture therethrough.

Extending through the central apertures of the portions 3 and those in the arms 6 are shafts 7 and 8 respectively, and upon the shaft 8, upon the inner side of each of the arms 6 there is mounted a traction wheel 9, these traction wheels being mounted upon the shaft 8 in the manner usual with the mounting of lawn mower wheels, so that the wheels will cause the shaft to be revolved when the mower is moved forward and will idle thereby when the mower is drawn backwardly.

Mounted upon the shaft 7 is a set of curved knives 10 of the type usually found upon grass mowing machines, and these knives pass over the forward edge of the cutter bar 11 which is secured in the following manner against the edges 4 of the plates. The cutter bar 11 has each end thereof upon the upper surface formed in an arcuate shape as at 12, and further has a pair of spaced vertical slots 13 formed through each end. The arcuate portion 3 of each of the plates, has formed therein, in the edge 4, a pair of threaded bores 14 into which adjusting screw 15, extending through the slots 13, are threaded. The heads 16 of the adjusting screws bear against the under side of the bar 4 and as they are drawn up, if one is tightened more than the other, the bar 11 will be rocked longitudinally to lift or depress the sharpened edge 17 of the bar to properly position the same beneath the cutting blades 10.

Each of the feet 5 extending from the portions 3 of the plates have apertures therethrough to receive securing bolts 18 which extend therethrough and into the end of a roller member 19 positioned between the feet 5. This roller member is to support the cutter blades and bar the proper distance above the ground as is well known in lawn mower construction.

Securing or tie rods 20 extend between the plates 1 and 2 and receive on the ends thereof bolts 21, after having passed through the plate.

The shafts 7 and 8, each extend a little distance beyond the plate 1 as shown and the shaft 8 carries a large gear wheel 22 thereon which meshes with an idler gear 23 supported upon the stub shaft 24 which is mounted upon the outer side of the plate 1 in alignment with and between the shafts 7 and 8, and this gear 23 in turn meshes with a pinion 25 which is keyed to the extended end of the shaft 7. Power transmitted to the shaft 8 and the gear 22 through the revolution of the traction wheels 9 causes the knives 10 to revolve across the cutter bar 11 to perform the grass cutting function.

At the forward end of each of the straight portions 4 of the plate 3, there is rotatably mounted upon the bolts 29' an auxiliary supporting wheel 30. These bolts as shown extend through the plate 3 and support the wheels 30 at the inner side of the plate. As will be readily apparent these wheels act to prevent the machine from being tipped forwardly to bring the forward edges of the plate 3 against the ground thus preventing the cutting knives 10 from digging into turf.

Pivotally mounted as at 26 upon the outer side of each arm 6 is an upwardly and inwardly directed arm 27, the ends of which are in spaced relation upon the longitudinal center of the machines, to receive therebetween the end of an operating handle 28.

In Figure 4 there is shown a slight modification of the structure disclosed in the other figures, in this construction the idler gear 23 is done away with and there is passed over the large gear 22 and the pinion 25 the sprocket chain 29 so that power is transmitted directly from the large gear to the pinion and the knives without the intervention of the extra gear 23.

Having thus described my invention what I claim is:

A lawn mower of the character described, comprising a pair of spaced substantially circular side plates each having a portion of its lower edge formed straight, an extension constituting a foot at the rear of said straight portions, a rearwardly and upwardly extending arm carried by each plate, a shaft connecting the ends of said arms, traction elements on said shaft, a roller extending between said foot portions, a shaft connecting between said plates, cutter elements carried on the last mentioned shaft to revolve therewith, means for taking power from said traction wheels to said cutter shaft to revolve the same, a cutter bar having its ends adjustably secured to the straight edge portions of said plates forwardly and above the lower edge of said foot extensions, and an auxiliary supporting wheel mounted upon each plate at the forward end of the straight portion thereof, and forwardly of said cutter bar.

In testimony whereof, I affix my signature hereto.

EDWARD O. WILSON.

Certificate of Correction.

It is hereby certified that the residence of applicant in Letters Patent No. 1,589,279, granted June 15, 1926, upon the application of Edward O. Wilson, for an improvement in " Lawn Mowers," was erroneously described and specified as " Madison, Wisconsin," whereas said residence should have been described and specified as *Madison, Nebraska*, as shown by the application records in this office; and that the said Letters Patent should be read with this correction therein that the same may conform to the record of the case in the Patent Office.

Signed and sealed this 3d day of August, A. D. 1926.

[SEAL.]
M. J. MOORE,
*Acting Commissioner of Patents.*